United States Patent [19]

Lanfer et al.

[11] Patent Number: 5,023,434

[45] Date of Patent: Jun. 11, 1991

[54] POSITION INDICATING APPARATUS FOR TRANSPORTERS ON TRACKS

[75] Inventors: Hermann Lanfer, Künzelsau; Dieter Kugler, Ohringen-Cappel, both of Fed. Rep. of Germany

[73] Assignee: R. Stahl Fördertechnik GmbH, Künzelsau, Fed. Rep. of Germany

[21] Appl. No.: 383,325

[22] Filed: Jul. 20, 1989

[30] Foreign Application Priority Data

Jul. 23, 1988 [DE] Fed. Rep. of Germany ....... 3825097

[51] Int. Cl.[5] .............................................. G06F 15/20

[52] U.S. Cl. .................................... 235/375; 235/384; 235/454; 235/469; 340/685; 340/686; 212/132; 356/401

[58] Field of Search ............... 235/375, 376, 454, 455, 235/384, 465, 469; 340/685, 686; 212/131, 132; 356/401; 250/566

[56] References Cited

U.S. PATENT DOCUMENTS 3,784,791 1/1974 Pease .................................. 235/454
4,176,996 12/1979 Oku .
4,638,170 1/1987 Kubota ............................... 250/566

FOREIGN PATENT DOCUMENTS 39921 11/1981 European Pat. Off. .
116636 8/1984 European Pat. Off. .
1221672 7/1966 Fed. Rep. of Germany .
3445830 6/1986 Fed. Rep. of Germany .

*Primary Examiner*—David Trafton
*Attorney, Agent, or Firm*—Frishauf, Holtz, Goodman & Woodward

[57] ABSTRACT

A position indicating apparatus, particularly for overhead transport systems (1), includes a elongated code carrier (11) carrying multi-value code marks (17) along its length. A code reading device (12) secured on a transport carrier (4), such as a trolley, crane, or other traveling mechanism, reads the code marks on the code carrier. To prevent erroneous reading when the transport carrier (4) and thus the code reading device (12) is tilted or skewed with respect to the code carrier, and to ensure accuracy of position of reading of the code carrier, the code marks (17) are arranged on the code carrier (11), one next to another in a single row or track, and formed such that m of the code marks provides one code word, the code words being positioned one next to each other and appear only once, or are unique along the entire code carrier. The code reader (12) has a reading station (19), for each bit, with three sets of reading heads (58*a*, 58*b*, 58*c*) per station (19) which are equidistantly distributed by a distance corresponding at least to the number of digits of a code word to provide, upon processing of outputs from all three reading heads, an unambiguous position indication.

19 Claims, 11 Drawing Sheets

| CODE WORD NUMBER | Q1 | Q2 | Q3 | Q4 | Q5 |
|---|---|---|---|---|---|
| 1 | 0 | 0 | 0 | 0 | 0 |
| 2 | 1 | 0 | 0 | 0 | 0 |
| 3 | 1 | 1 | 0 | 0 | 0 |
| 4 | 0 | 1 | 1 | 0 | 0 |
| 5 | 0 | 0 | 1 | 1 | 0 |
| 6 | 1 | 0 | 0 | 1 | 1 |
| 7 | 0 | 1 | 0 | 0 | 1 |
| 8 | 1 | 0 | 1 | 0 | 0 |
| 9 | 1 | 1 | 0 | 1 | 0 |
| 10 | 0 | 1 | 1 | 0 | 1 |
| 11 | 1 | 0 | 1 | 1 | 0 |
| 12 | 1 | 1 | 0 | 1 | 1 |
| 13 | 1 | 1 | 1 | 0 | 1 |
| 14 | 1 | 1 | 1 | 1 | 0 |
| 15 | 0 | 1 | 1 | 1 | 1 |
| 16 | 1 | 0 | 1 | 1 | 1 |
| 17 | 0 | 1 | 0 | 1 | 1 |
| 18 | 1 | 0 | 1 | 0 | 1 |
| 19 | 0 | 1 | 0 | 1 | 0 |
| 20 | 0 | 0 | 1 | 0 | 1 |
| 21 | 0 | 0 | 0 | 1 | 0 |
| 22 | 1 | 0 | 0 | 0 | 1 |
| 23 | 0 | 1 | 0 | 0 | 0 |
| 24 | 1 | 0 | 1 | 0 | 0 |
| 25 | 1 | 0 | 0 | 1 | 0 |
| 26 | 1 | 1 | 0 | 0 | 1 |
| 27 | 1 | 1 | 1 | 0 | 0 |
| 28 | 0 | 1 | 1 | 1 | 0 |
| 29 | 0 | 0 | 1 | 1 | 1 |
| 30 | 0 | 0 | 0 | 1 | 1 |
| 31 | 0 | 0 | 0 | 0 | 1 |

Fig. 4

| SHIFT REGISTER LENGTH | FEEDBACK FROM OUTPUT | PERIOD LENGTH |
|---|---|---|
| 2 | 1, 2 | 3 |
| 3 | 1, 3 | 7 |
| 4 | 1, 4 | 15 |
| 5 | 2, 5 | 31 |
| 6 | 1, 6 | 63 |
| 7 | 3, 7 | 127 |
| 8 | 2, 3, 4, 8 | 255 |
| 9 | 4, 9 | 511 |
| 10 | 3, 10 | 1023 |
| 11 | 2, 11 | 2047 |
| 12 | 1, 4, 6, 12 | 4095 |
| 13 | 1, 3, 4, 13 | 8191 |
| 14 | 1, 6, 10, 14 | 16383 |
| 15 | 1, 15 | 32767 |
| 16 | 1, 3, 12, 16 | 65535 |
| 17 | 3, 17 | 131071 |
| 18 | 7, 18 | 262143 |
| 19 | 1, 2, 5, 19 | 524278 |
| 20 | 3, 20 | 1048575 |

Fig. 5

| CYCLE NO. OR CODE WORD NUMBER | Q1 | Q2 | Q3 |
|---|---|---|---|
| 1 | 0 | 0 | 0 |
| 2 | 1 | 0 | 0 |
| 3 | 2 | 1 | 0 |
| 4 | 0 | 2 | 1 |
| 5 | 0 | 0 | 2 |
| 6 | 2 | 0 | 0 |
| 7 | 0 | 2 | 0 |
| 8 | 1 | 0 | 2 |
| 9 | 0 | 1 | 0 |
| 10 | 1 | 0 | 1 |
| 11 | 1 | 1 | 0 |
| 12 | 2 | 1 | 1 |
| 13 | 2 | 2 | 1 |
| 14 | 2 | 2 | 2 |
| 15 | 1 | 2 | 2 |
| 16 | 0 | 1 | 2 |
| 17 | 2 | 0 | 1 |
| 18 | 2 | 2 | 0 |
| 19 | 0 | 2 | 2 |
| 20 | 2 | 0 | 2 |
| 21 | 1 | 2 | 0 |
| 22 | 2 | 1 | 2 |
| 23 | 1 | 2 | 1 |
| 24 | 1 | 1 | 2 |
| 25 | 0 | 1 | 1 |
| 26 | 0 | 0 | 1 |

POSITION INDICATING APPARATUS FOR TRANSPORTERS ON TRACKS

FIELD OF THE INVENTION

The present invention relates to positioning apparatus, and more particularly to indicate the position of a transport carrier on a rail or track, especially on an overhead rail or track, which carries code markings.

BACKGROUND

A positioning device for a transporting system is known from German Patent Disclosure Document DE-OS 3,445,830, Kuehrer, in which a traveling crane carries two lasers that scan reference elements located on the ground. The reference elements consist of two marking surfaces arranged at a certain distance and a specific direction relative to each other. One of the marking surfaces has a longitudinally extended configuration in the form of a strip and is scanned by one of the laser beams, while the other marking surface has a very small surface dimension and is detected by the second laser beam. Both marking surfaces are arranged in such a way that both can be detected by the respective laser beams only upon reaching a desired position.

This arrangement can control only certain positions established by the marking surfaces within the working range of the transport system. Otherwise, the ground under the crane would be completely covered by the marking surfaces and this space would not be available for depositing loads. In addition, it is possible to control only the travel to end position with the known positioning apparatus.

Coded path indicators with which distances can be absolutely measured are known from "Steuern und Regeln im Maschinenbau" (Control and Adjustment in Machine Construction), 3rd Edition, Europa-Lehrmittel Publishers, Wuppertal. A code reading apparatus is moved along a code carrier and the code marks found on the code carrier are scanned by reading heads. Several code marks form a code word on the code carrier, which represents a direct measurement for the code reading apparatus of the path covered from an established reference point.

In this known apparatus, the code word is formed by code marks on several tracks, which lie side by side along the code carrier. Care must therefore be taken that the tracks lie precisely side by side, and the alignment of the markings is accurate. Also, the reading heads, which are arranged in rows next to each other and crosswise to the direction of motion, must be skewed with respect to reference or clock tracks. If misalignment occurs, for example, by skewing, a skew error arises and code marks from code words lying next to each other are mixed up and read together, thus leading to errors. Such a measurement system is thus limited preferably to applications in which the spatial dimensions are small and a precise guiding of the reading heads with respect to the code carrier can be achieved. In crane construction, large tolerances must be accepted, which makes it impossible to use such a measurement device.

The Invention. It is an object to provide a position indicating apparatus which is highly accurate, without requiring precise alignment of a code reader on a transport carrier with respect to the code carrier located on the rail or track, so that the measurement is effectively insensitive with respect to tilting or tipping of the code reader with respect to the code carrier.

Briefly, code markings are located on the code carrier and placed in a single row, one code marking laterally adjacent, preferably next to another; the code markings are arranged along the code carrier in accordance with a predetermined sequence, and m sequential code markings form a code word. The predetermined sequence is so selected that any sequence of m sequential code markings, and forming a code word, appears only once on the code carrier.

Since only a single code track is present in the system, it is effectively insensitive with respect to tipping or inclination between the code reader and the code carrier. The same code word is always read by the reader independent of inclination angles normally encountered in operation of a conveyor system; this assumes that the inclination is not so extreme that the reading device actually leaves the code carrier, that is, reads beyond the code carrier. Offset in height or level of the code carrier with respect to the reader practically has no effect. This substantially simplifies application of the code carrier to the rail or track so that accurate position of the code carrier on the rail is not required.

The code words occur only once along the carrier. Thus, even after a stop of the transport carrier, for example due to breakdown of the equipment, it is still readily possible to immediately establish the position of the transport carrier or traveling mechanism or trolley or other apparatus, the position of which has to be determined, without moving the respective transport carrier or traveling mechanism. This is of particular importance when high supports are used since, in that case, an error with respect to the true position of the traveling mechanism might, upon restarting, cause considerable damage. Movement for determining the position of the traveling mechanism or transport carrier is to be avoided especially in systems high aboveground, since determining the position by first moving the transport carrier might already cause damage.

Sequences of code marks, which have the above-mentioned property of being placed once along the code carrier can be generated in the simplest way according to the theory of primitive polynomials by means of feedback shift registers. The unique definition of each individual code word is, as numerical theory demonstrates, guaranteed in this way.

In order to be able to determine the position as rapidly as possible and without any movement , the code reading device contains a station with reading heads for each place of the code word, i.e., for a ten-place code word, ten reading stations are arranged next to each other. Their relative distance is equal to the length of a code mark on the code carrier.

In accordance with a feature of the invention, and in order to be able to establish whether the code word supplied by the reading heads is a true code word or has been falsified in that one or several of the reading stations have skipped to the next code mark, while other reading stations read the preceding code mark, without employing additional mechanical means, each station has three reading heads, which are arranged interleaved into each other. In this way, two directly adjacent sets of reading heads serve to generate the code word, while the third set supplies the aid for deciding which of the two sets of reading heads may possibly be associated with an error and which of these reads without error.

Since the code words read off by the code carrier in continuous travel of the trolley are not lexicographically arranged, if the code words are interpreted as a binary number, it is appropriate to convert the code word into a binary number, which corresponds to the number of the code word within the generating code sequence table. The determination of the trolley position is then made after converting the product of the code mark length by the number of the code word read, with respect to the origin of the table, which agrees with the code-carrier origin.

In addition to the above-mentioned purely electronically operating monitoring of the reading heads for possible reading error, electromechanical solutions are also conceivable, in which one of the track rollers supplies a timing signal, which establishes when the information delivered by the reading heads is correct information and when the reading heads lie ambiguously over the edges or limits of a code mark.

DRAWINGS

An example of embodiment of the subject of the invention is shown in the drawing. Here:

FIG. 4 shows the code words or numbers to be generated successively with the shift register according to FIG. 3, with the respective number;

FIG. 5 shows a table of possible primitive polynomials for longer or shorter shift registers for generating pseudo random numbers;

DETAILED DESCRIPTION

Figure 1:
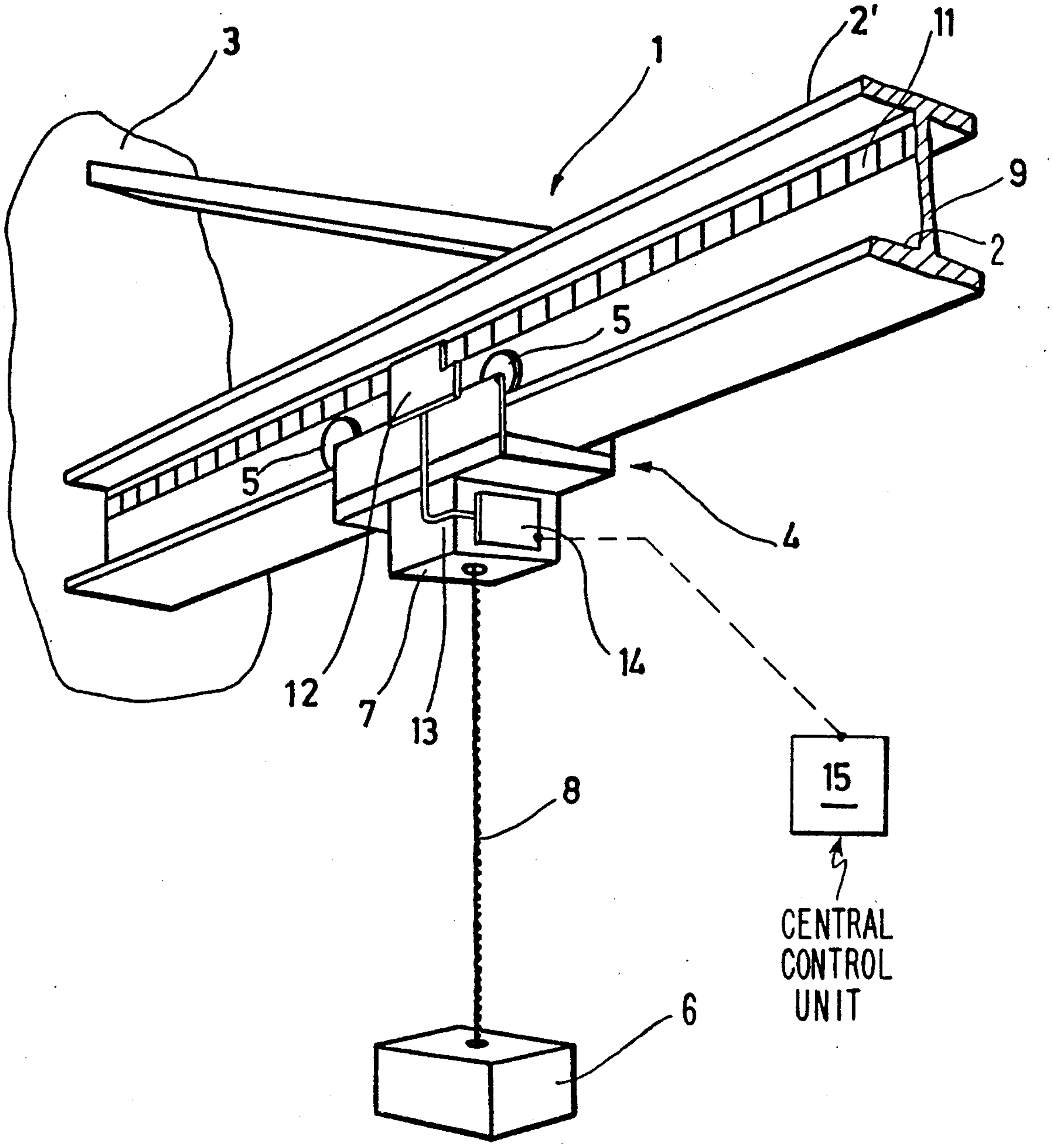
FIG. 1 shows an overhead crane arrangement with a position indication system according to the invention in a perspective representation.

A crane 1 has a boom 2′, which forms a horizontally extending running rail 2, in the form of an I-beam, and which projects on one end from a wall 3 not illustrated in detail in FIG. 1. A transporting unit formed as a crane trolley 4 can run along running rail 2; the trolley can be moved lengthwise in the longitudinal direction of running rail 2 by means of track rollers 5, at least one of which can be driven by a drive device which is not shown. The crane trolley 4 is provided with a conventional hoist 7 for raising and lowering, and load 6 can be attached to its suspension mechanism 8.

A code carrier 11 is attached to crosspiece 9 of the I-shaped running rail 2, and this carrier extends over the entire length of the only briefly represented running rail 2. A code reading apparatus 12, which is located on crane trolley 4 works together with this code carrier 11, and thus runs along and scans code carrier 11 when crane trolley 4 moves lengthwise along running rail 2. Code reading apparatus 12 is coupled to an electronic evaluating unit 14 by a connection 13. Unit 14 transmits the scanned data to a central control unit 15 by means of slide contacts and busbars which are located on the opposite side of crosspiece 9 of boom 2′. Control circuit 15 controls stops or starts of the drive device of crane trolley 4 depending on the position that is reached. The slide contacts for the drive mechanism are also located on the back side of crosspiece 9 and are thus not visible in the drawing.

Figure 2:
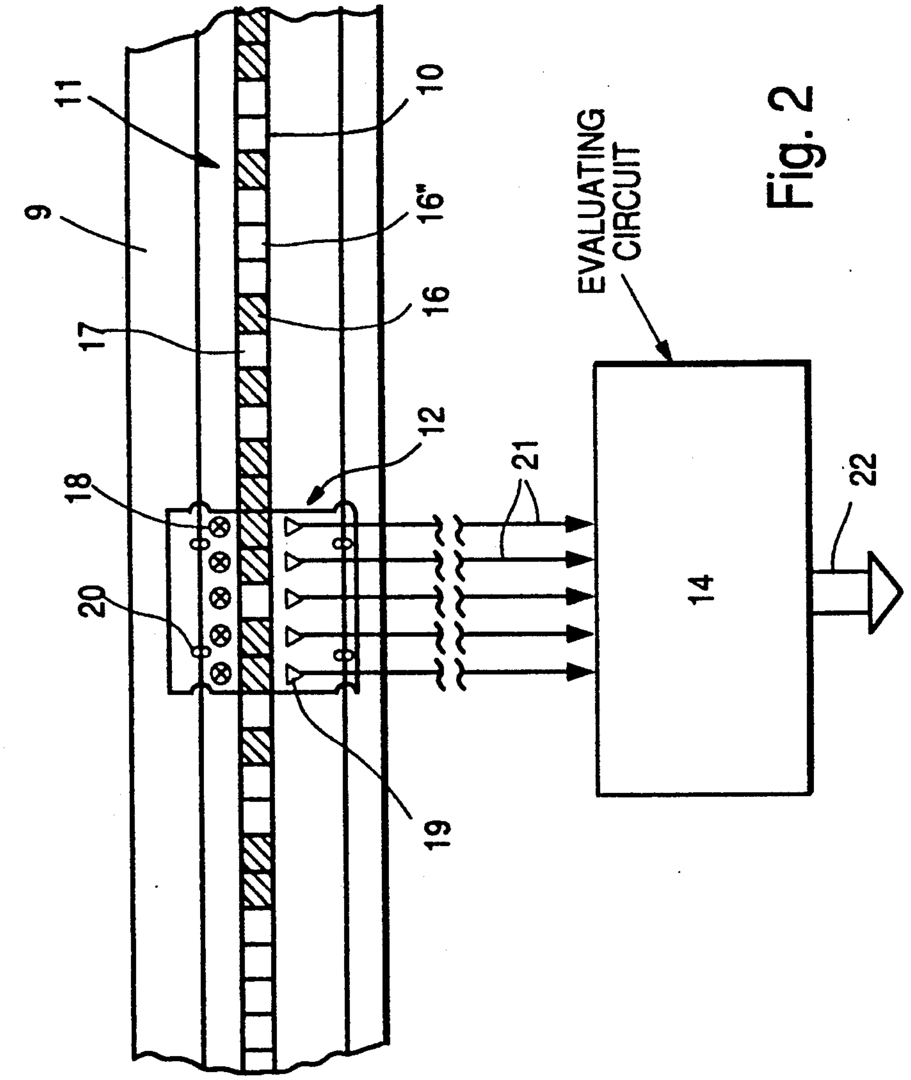
FIG. 2 shows a section of the running rail of the crane according to FIG. 1 with illustration of the code carrier and the code/reading apparatus operating together with it.

A part of crosspiece 9 is shown in section in an enlarged and somewhat schematic view in FIG. 2. The code carrier 11 consists of a longitudinal band or ribbon or strip 10 which is attached to crosspiece 9 and extends over the entire length of running rail 2. For longer lengths of running rail 2, code carrier 11 is formed of several bands 10 , butt-joined one next to the other, that is, flush without any intermediate space. Square fields 16 of the same size can be seen on these bands 10, and these fields symbolize the individual code marks 17. These fields are either opaque, such as field 16′, or transparent, such as field 16″, whereby two different values, zero and one, can be represented. For example, the value zero is assigned to opaque field 16′, and the value one is assigned to transparent field 16″.

Code carrier 11 is scanned or read by means of code reading apparatus 12, which has lamps 18 opposite the top side of code carrier 11, and reading stations 19 opposite the lower side. Both reading stations 19 and lamps 18 are placed on a common frame 20, which is joined with crane trolley 4 and when crane trolley 4 moves parallel to code carrier 11, it moves along with it. Each of reading stations 19—there are five in the example of embodiment that is shown—is coupled by connection lines 21 to the evaluating circuit 14, which couples their data in the central control 15 via contact lines 22.

The code carrier 11 which is shown, is a transmissive code carrier, which transmits more or less light from the illumination device to the reading station depending on the value of the code mark. A reflexive code carrier may also be used instead of transmissive code carrier 11, and in this case, the illumination device and the reading stations are found on the same side of code carrier 11, and the reading station evaluates the light reflected from the reflexive code carrier in order to generate a digital zero or a digital one, depending on the reflection characteristics of the corresponding mark in each case.

In accordance with a feature of the invention, code marks 16 are arranged in one track or row, one behind the other along rail 2 without any gaps, so that tiltings and skewings of the reading stations 19 arranged in a row next to each other in the longitudinal direction of code carrier 11 cannot produce reading errors.

A five-place binary number can be read with five reading stations 19; its maximum value is 31, so that a total of 32 different numerical values can be distinguished. Generally expressed, $N=x^m$ different numbers may be represented, whereby x is the value of a numerical position and m is the number of numerical places. The maximum number that can be represented is thus $N=x^m-1$. Thus the greater the number of reading stations 19, then the greater the amount of different numbers and thus more positions of crane trolley 4 which may be distinguished from each other, or the running rail 2 may be longer, as long as the resolving capacity of precision of positioning of crane trolley 4 is not compromised. The resolution capacity of positioning accuracy is based essentially on the longitudinal extent of a code mark 17, in the longitudinal direction of running rail 2, since reading stations 19 may be placed arbitrarily within a code mark, without changing the digit that is read off.

It is understood that on this basis a much greater number of reading stations 19 will be used in practice in order to be able to reach a positioning accuracy of, for example, 1 cm for the lengths of running rail 2 that are used in practice. The number of reading stations 19 that is shown is thus only given as an example and is somewhat low in order not to unnecessarily complicate understanding.

In order to be able to uniquely read the position of crane trolley 4 along running rail 2 with the code marks 17 arranged next to one another in a track, of which five immediately adjacent marks may be read simultaneously, each arbitrary group of five code marks lying next to each other along running rail 2 must be unique, i.e., this group should occur only once along running rail 2. The term code word will be used hereinafter for a group of five code marks lying next to one another.

Sequences of numbers, which fulfill the above condition that each number occurs only once within the sequence are so-called pseudo-random numbers. They can be produced according to the theory of "primitive polynomials" by means of a linear feedback shift register, whose number of places corresponds to the number of places in the binary code word.

Figure 3:
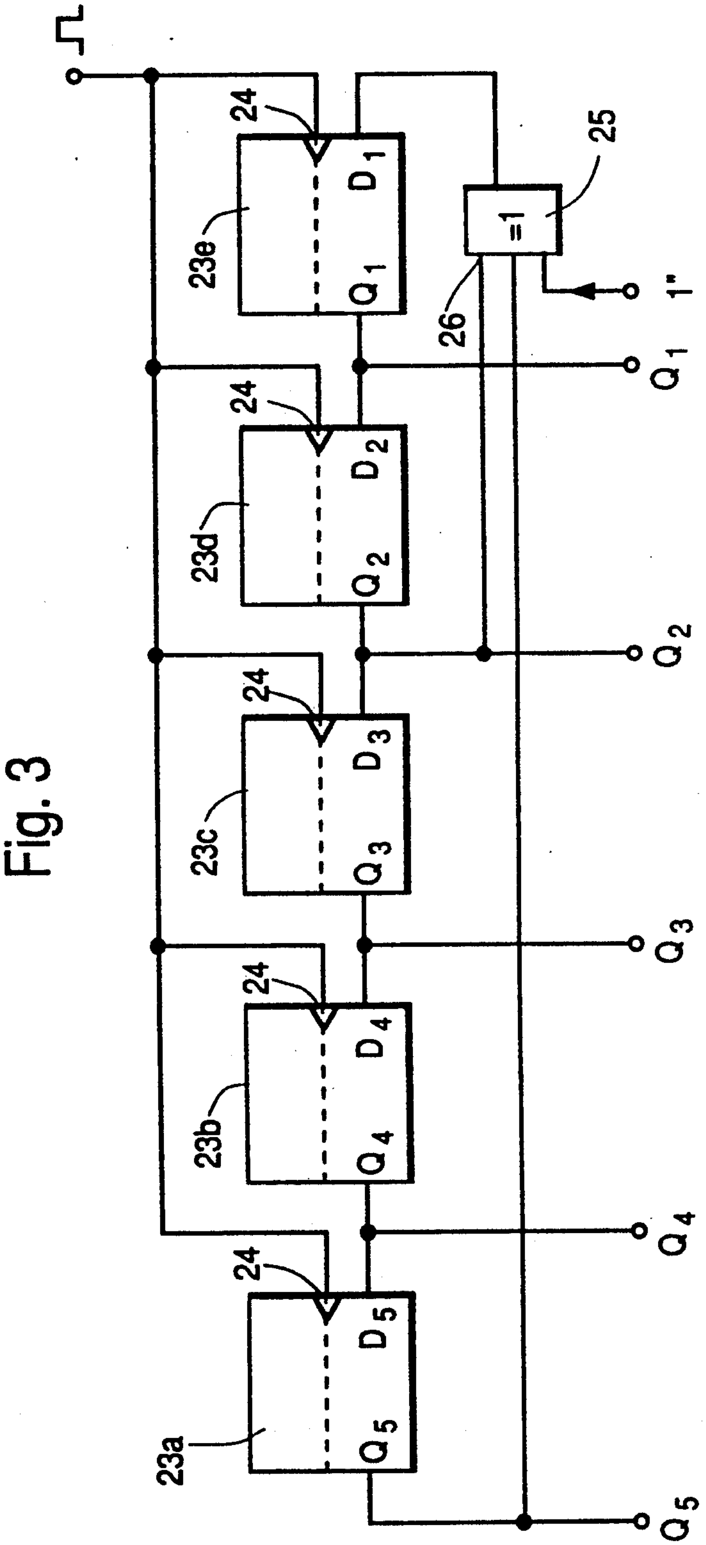
FIG. 3 shows a five-place feedback shift register for producing a pseudo-random numerical sequence, in which each number occurs only once within the sequence.

The shift register producing a five-place code is shown in FIG. 3. This register contains a total of 5 D flipflops 23*a* . . . 23*e*, whose clock inputs 24 are connected in parallel, so that they change their state simultaneously. The state that they assume each time according to the timing or clock pulse depends on the state that the Q output of the preceding flipflop 23*a* . . . 23*e* had. The D input of flipflop 23*a* is connected with the Q output of flipflop 23*b*, the D input of flipflop input 23*b* is connected with the Q output of flipflop 23*c*, etc., up to flipflop 23*e*. Lying at the D input of flipflop 23*e* is a modulo-2 summing device 25 with three inputs 26, one of which is connected to the Q output of flipflop 23*d*, and the other with the Q output of flipflop 23*a*, while finally a binary "one" is continually fed into the third. Modulo-2 summing device 25 has the property that its output provides a logic "one" then only when an odd number of its input connections is logically in one state.

Now if all the D flipflops 23*a*. . . 23*e* are reset prior to the input of the first timing pulse, i.e., an L or low signal is applied to their Q output, then two of the inputs 26 of modulo-2 summing device 25 are also on L, while the third input has an H or high signal. The output of modulo-2 adder 25 also has an H level which is fed to the D input of flipflop 23*e*. After the decay of the timing pulse, flipflop 23*e* is thus in the ONE state, while the remaining flipflops are in the ZERO state, both before and after. After the second timing pulse, the two flipflops 23*e* and 23*d* are in the ONE state, while the remaining flipflops are still in the ZERO state. Now, since modulo-2 summing device 25 has an H signal at two of its inputs 26, its output changes to L, i.e., with the next timing impulse, the shift register draws in a ZERO, and the flipflop 23*e* will be in the ZERO state. The two flipflops 23*c* and 23*d* are in the ONE state, while finally, flipflops 23*a* and 23*b* again have the ZERO state. Further states, which may be assumed by flipflops 23*a*. . . 23*e* with further cycles following one behind the other are shown in the table of FIG. 4. It can be seen that within a period length of a total of 31 numbers, every five-place binary number occurs only once. Now if, starting from binary ZERO, i.e. five consecutive ZEROs, one extends the last result to the left by the binary number which arises successively on the Q output of flipflop 23*e*, then one finally obtains a sequence of 35 binary digits, in which each successive five binary digits form one of the code words or binary numbers reproduced on the table of FIG. 4. On the basis of the code word represented by the binary string thus produced, one may unambiguously recognize which code word of the table according to FIG. 4 is in question, or, in other words, how many steps are necessary to arrive at the respective code word from code word "0".

If the sequence of binary ones and zeros generated according to the above description are introduced onto code carrier 11 as code marks 17 in the form of a light-/dark marking, as is done in FIG. 2 from left to right, that is, the mirror image of the table according to FIG. 4 ; then, on the basis of the code word read, it can be clearly established where crane trolley 4 is found along running rail 2. By means of the read code word it can be established which code word is represented from the table according to FIG. 4, i.e., how many steps or code word changes were necessary to arrive at the respective code word. The step length or number of changes corresponds to the length of a code mark; thus the distance of crane trolley 4 from the origin of code carrier 11 is equal to the length of a code mark 17 multiplied by the position of the code word in the table.

FIG. 5 contains a table which gives the lengths that a shift register according to FIG. 3 must have, and how the individual outputs of the shift register must be coupled in the modulo-2 operation in order to establish the binary number will be fed into the lowest-value D flipflop. According to the selected length of the shift register, which also corresponds to the number of reading stations 19 on crane trolley 4, a respective number of code words and thus the increments may be distinguished, which the crane trolley 4 may travel on running rail 2 measured from the beginning of running rail 2, without ambiguous values occurring in the position indication of crane trolley 4 along running rail 2.

As results from the above, the lengths of all the individual code marks 17, which are the same length one after the other, establishes the step length, according to which, when it is exceeded, reading stations 19 of reading device 12 read a new code word. The code word read defines how many steps are necessary, on the basis of its position within the table of FIG. 4, in order to travel from code word zero to the code word read.

Figure 6:
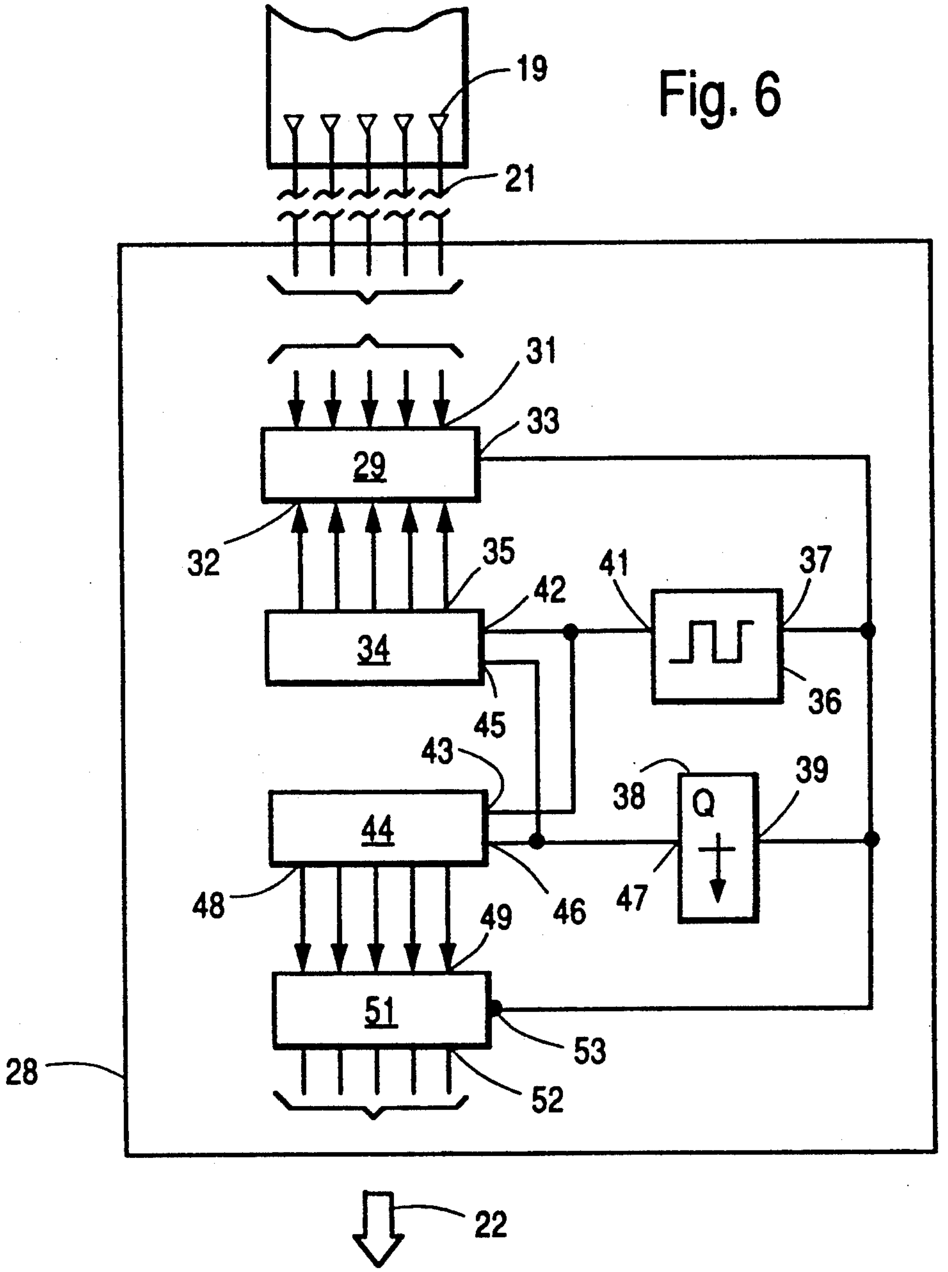
FIG. 6 shows the block diagram of a circuit assembly for converting the code word read into the number of the code word by means of a shift register according to FIG. 3, and of a binary counter.

Since, for further control of the trolley 4, the step number is easier to process than the pseudo-random code word actually read, a conversion of the code word read to a binary number, which indicates the number of steps travelled from the origin of code carrier 11 is produced in evaluation circuit 14. A converting circuit 28 suitable for this purpose is shown in FIG. 6. It contains a binary comparator 29 with two sets of inputs 31 and 32, which have one input connection for each place of a multi-place binary word in order to be able to test the identity of two bit-parallel multi-place binary words. The level at output 33 is H or L, depending on the result of this comparison. Specifically, it is state H, if the two binary words are different and L, if the two binary words are identical.

The binary word supplied by reading stations 19, which is fed via connection 21 to input 31, is compared with a binary word, which a shift register 34 produces at its binary output 35. This shift register has the structure explained in FIG. 3 and also operates in the same way. For each binary place in the binary word, output 35 has a connection, which is correspondingly joined to a respective connection of input 32 on the comparator.

The signal of output 33 on the one hand controls a start/stop oscillator 36 on its inhibit input 37, and on the other hand a non-retriggerable monostable flipflop or monoflop 38 at its trigger input 39. The two inputs 37 and 39 are connected to output 33 by means of respective connection.

Start/stop oscillator 36 contains a clock output 41, which is connected with a clock input 42 of shift register 34 as well as a clock input 43 of a binary counter 44 by means of respective lines. Both shift register 34 and binary counter 44 have a reset input 45 or 46, both of which are cross connected via lines with an output 47 of monoflop 38 for resetting.

Binary counter 44 has bit-parallel 48, i.e., a suitable output connection for each binary place and is connected with a data input 49 of an output register 51 by parallel data leads. The bit-parallel output 52 of the latter is connected to contact lines 22. The output register 51 is controlled via a load input 53, such that the binary word received at input 49 is coupled to the output, if an L level is applied to input 53.

OPERATION

The circuit that has been described thus far operates in the following way: As long as the binary word, which is supplied from reading stations 19 to input 31 agrees with the binary word which shift register 34 feeds into input 32, output 33 has the L level. This L level inhibits at inhibit input 37 the start/stop oscillator 36 and also provides for the fact that output 52 at output register 51 provides the same binary word which is fed to input 49. Now if crane trolley 4 travels a bit farther, and, in fact, is more than one code mark 17 along code carrier 11, the code word read by reading stations 19 changes, which is consequently different from the code word produced in shift register 34. Output 33 of comparator 29 thus changes from L to H, whereby on the one hand, start/stop oscillator 36 is released at its inhibit input 37 and on the other hand, monoflop 38 is triggered by the positive flank or side going to H. Monoflop 38 thereupon supplies a short reset pulse both to counter 44 and to shift register 34, both of which are brought to state 00000. Simultaneously, in output register 51, output 52 is separated from input 49, and thus the old binary number remains at output 52 during the subsequent counting process.

As soon as the reset pulse of monoflop 38 dies out, the clock pulses from the start/stop oscillator 36 begin and shift register 34 is cycled and simultaneously counter 44 counts up. Shift register 34 produces with each applied clock pulse, proceeding from code word 00000, each subsequent code word from the table of FIG. 4 and this occurs until finally the code word produced agrees with the code word which the five reading stations 19 supply. When this state is reached, output 33 switches from H to L, whereby start/stop oscillator 16 is stopped and load input 53 of output register 51 is released. Then at output 52 of output register 51, there appears that binary number which binary counter 44 until identity was reached between the two code words, i.e., the code word read by reading stations 19 is identical to the code word produced by shift register 34. This binary number is, as results from the above description, that number of steps, which crane trolley 4 must have travelled from the origin of code carrier 11 to reach the detected position.

This step number is supplied to central control 15 via slide, or slip contact lines 22.

Since this counting process occurs in much shorter time than that which crane trolley 4 requires in order to travel the distance of the code mark length, i.e., to travel a discrete step, the actual numbers of the steps are reported to the central control 15 by means of contact lines 22.

Figure 7:
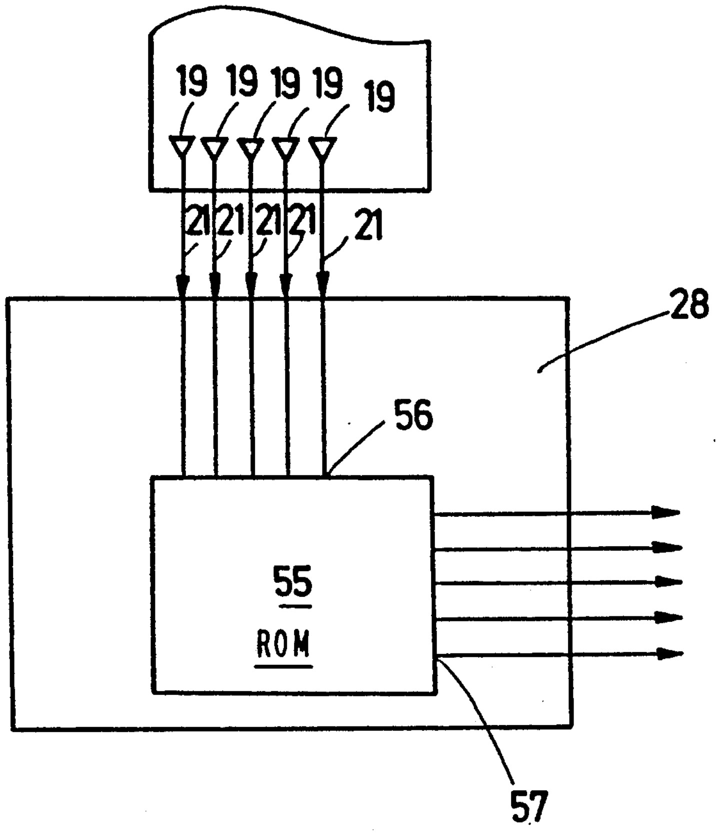
FIG. 7 shows the block diagram of a conversion circuit for converting a code word read into this number by means of a ROM memory.

Another possibility for converting the code word read each time to the corresponding step number is shown in FIG. 7. Here, conversion circuit 28 contains a ROM (Read-only memory) 55, in whose address input 56 the code word supplied by reading stations 19 is fed by means of lines 21. ROM 55 then generates at its data outputs 57 a binary number, which gives the position of the code word in the table of FIG. 4 and thus the step number, at which crane trolley 4 is found. Thus, the distance of crane trolley 4 from the origin of code carrier 11 is equal to the code mark length multiplied by the step number.

For simplicity, the operational description was based on the assumption that all reading stations 19 change abruptly precisely at the same time, so that the reading state changes synchronously in jumps and one reading station does not come a little before an adjacent one. In practice, this assumption cannot be achieved due to the division error of code carrier 11 and the different response characteristics of the individual reading stations 19. If only one of the reading stations 19 is switched over spatially later than the others as the code carrier 11 is scanned, an erroneous code word arises. Since the code words are neither arranged lexicographically nor contain a redundancy, it cannot be decided based on whether a permissible code word has been read or not.

Figure 8:
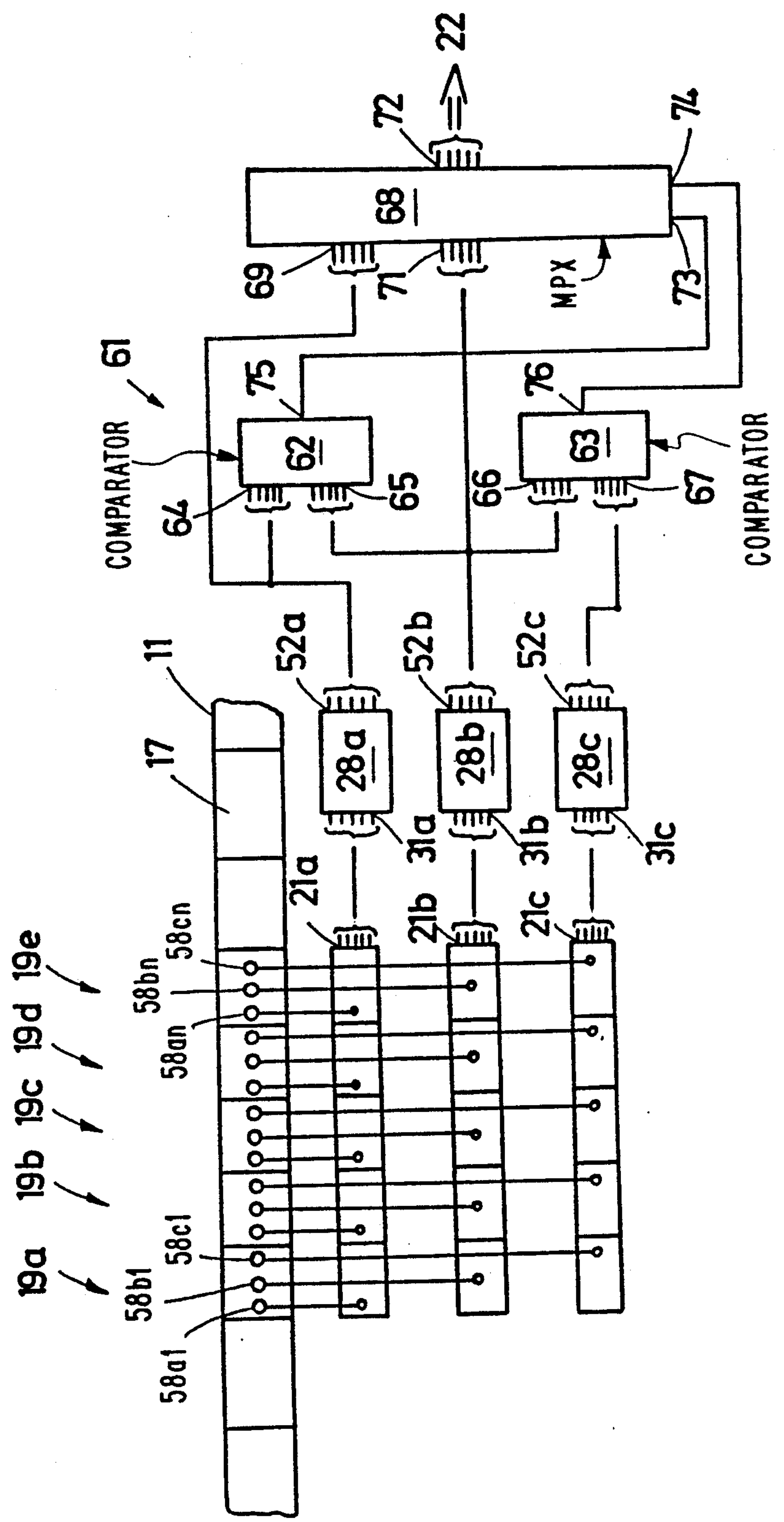
FIG. 8 shows the block diagram of a selection circuit according to the example for determining that set of reading heads, which displays a unique position with respect to the code carrier and reads a true code word.

In accordance with a feature of the invention, and to ensure unambiguous reading, each reading station 19 contains three reading heads 58*a*, 58*b*, 58*c* (FIG. 8). The heads 58*a*, 58*b*, 58*c* are arranged equidistant from each other, which in the electrooptical system 12 are formed by a photodiode or by a phototransistor. Since heads 58*a*–58*c* are arranged equidistant and since reading stations 19*a*–19*e* of FIG. 8 are also distributed equidistantly, the distance between directly adjacent reading heads 58 of adjacent reading stations 19*a*, 19*b*, for example, is equal to the spacing of adjacent reading heads 58 within a reading station 19*a*–19*e*. The sets 58*a*1 . . . 58*an*; 58*b*1 . . . 58*bn*; 58*c*1 . . . 58*cn* of reading heads are nested, or interleaved, dispersed, or interlaced, i.e.,all reading heads with the designation "a" belong to set "a", located on the left, while all those of set "b" with designation "b" are central, and all those of set c with designation "c" belong to the right set.

Selection circuit 61 is provided to distinguish which group of reading heads 58*a*–58*c* stands correctly in front of code marks 17 and which lies accidentally undesirably over a code mark boundary. Selection circuit 61 contains three converter circuits 28*a*–28*c*, each of which is constructed as shown in FIG. 6 and each of which correspondingly has an input 31*a*–31*c* with five connections each. For example, all reading heads 58*a* of reading stations 19*a*–19*e* lying next to each other are connected to conversion circuit 28*a* at its input 31*a*. This means that every third reading head of the total fifteen reading heads, beginning with the one arranged leftmost, is connected with conversion circuit 28*a*. Accordingly, heads 58*b* of reading stations 19*a*–19*e* are connected to conversion circuit 28*b*, and finally, all reading heads 58*c* of reading stations 19*a*–19*e* are connected to input 31*c* of conversion circuit 28*c*. In this way, three groups or sets of reading heads interleaved in each other are formed, whose code word read each time is converted into a binary word, independently of the other code words read in conversion circuits 28*a*–28*c*. Since reading heads 58 are spaced one from the other by a distance which is equal to one-third of the length of a code mark 17, six cases may be distinguished from each other by the reading of five code marks 17, one following the other.

It is first assumed that reading heads 58 are located, as shown in FIG. 8, over code marks 17. All three conversion circuits 28*a*–28*c* supply the same binary word at their outputs 52*a*–52*c*. If, proceeding from this situation, code carrier 11 has moved a bit further to the right, so that boundaries between neighboring code marks 17 are found at reading heads 58*a* of reading stations 19*a*–19*e*, then the binary word obtained from these reading heads and thus from conversion circuit 28*a* is ambiguous. Yet the two sets of reading heads, which comprise reading heads 58*b*1 . . . 58*bn* an 58*c*1 . . . 58*cn* the same information and consequently their evaluation circuits 28*b* and 28*c* give identical binary numbers. The binary number given in conversion circuit 28*a* can either be the next-lower number, if the code carrier is shifted to the right, or it can be another random one.

The state when both conversion circuits 28*b* and 28*c* supply the same binary number stops as soon as that set of reading heads 58, which is comprised of reading heads 58*b*1 . . . 58*bn* has reached a position at the boundary between adjacent code marks 17, along code carrier 11 opposite reading station 12. In this case, under certain circumstances, all three conversion circuits 28*a*–28*c* supply different binary numbers, of which, however, as a simple geometric consideration, shows, both that binary number which is supplied by circuit 28*a* as well as that produced by circuit 28*c* is a correct binary number.

Upon a further shift of code carrier 11 to the right, finally the limits between neighboring code marks 17 will reach the region between reading heads 58*b* and 58*c* of each reading station 19*a*–19*e*, so that conversion circuits 28*a* and 28*b* indicate identical binary numbers at their outputs 52*a* and 52*b*.

On the basis of this distinguishing case, it can be recognized which set of reading heads 58*a* or 58*b* or 58*c* supply the correct results and which set produces an invalid result in the otherwise error-free operation. (1) if at least two binary numbers which are at outputs 52, are identical, this binary number reflects the true position of reading apparatus 12 or crane trolley 4. (2) if all three binary numbers are different, then both output 52*a* and output 52*c* supply true corresponding binary numbers. The numbers differ from each other by one step, since one of the sets of reading heads, either 58*a* or 58*c* is already fully reading the new code word, while the other set i.e. 58*c* or 58*a*, is still unambiguously recognizing the old code word. Thus, it is a matter of convention whether in this situation the binary number of conversion circuit 28*a* or that of conversion circuit 28*c* will be further switched to central control unit 15.

Selection circuit 61 thus has two binary comparators and 63 which operate independently of one another and these comparators have inputs 64, 65, 66, and 67, which in this example can process five bits each, in parallel.

Individually, output 52*a* is connected to input 64, output 52*b* to input 65 and input 66, and finally output 52*c* to input 67. Further, a multiplexer 68 is provided, each of which has two five-bit long inputs 69 and 71 as well as one five-bit long output 72. Multiplexer 68 is controlled on both of its selection inputs 73 and 74, which obtain their signal from comparative outputs 75 and 76 of the two binary comparators 62 and 63. Specifically, the two inputs 69 and 71 are connected to outputs 52*a* and 52*b*, as shown, while selection input 73 is connected with comparison output 75 and selection input 74 with comparison output 76.

Now, if, as described earlier in detail, the case occurs that the two conversion circuits 28*a* and 28*b* supply the same binary number as conversion circuit 28*c*, then both ( comparison outputs 75 and 76 are in the H state, and multiplexer 68 switches input 71 to output 72. When code carrier 11 has travelled so far that only the two conversion circuits 28*c* and 28*b* supply the same binary number, output 75 changes to L, while output 76 remains at H. In this case also, multiplexer 68 switches input 71 to output 72. Only when after reaching the next state, the two conversion circuits 28*a* and 28*b* supply the same binary number and the binary number of conversion circuit 28*c* is different, does binary comparator 62 generate an H signal at its output 75, while output 76 goes to L. Multiplexer 68 reverses by this means and it now switches input 69 to output 72. If in the intermediate state, the edges between neighboring code marks 17 are in front of reading heads 58*b*, then all three binary numbers, which are supplied by conversion circuits 28*a*–28*c* are different from one another, i.e., both binary comparators 62 and 63 supply an L signal at their output. In this case, multiplexer 68 switches input 69 to output 72, which corresponds to the state which arises when the two conversion circuits 28*a* and 28*b* produce the same binary number.

The comparator circuit 61 is shown with two comparators 62 and 63 only -for simplicity. When establishing the truth table for switching over multiplexer 68, it is not difficult to recognize that the actuation of multiplexer 68 is exclusively dependent on the signal at input 74 and thus is dependent on binary comparator 63. In an optimized circuit, binary comparator 62 may thus be omitted, and the comparator is controlled only via a single selection input, i.e., input 74.

Thus it is possible by using three reading heads per reading station to uniquely recognize the position of reading apparatus 12 with respect to code carrier 11. The circuit that is shown for deciding which code read is a correct code word is only given by way of example, and other circuits are also possible. In the same way, the use of optically operating reading heads only is one example of reading heads. It is also possible, instead of photodiodes or phototransistors which work together with lamps, to use reading heads that are based on pneumatic or magnetic effects, particularly pressure sensors or magnetic field probes.

Finally, it is possible to connect conversion circuit 28 to the output of multiplexer 68 and instead, comparing the code words of the three sets supplied by reading heads 58*a*-58*c* directly by a binary comparator, to transmit the code word which is read from the middle set of reading heads when, for example, the code word read by the middle set is identical to the code word read by the right set, and if the code words of the middle and right sets are unequal, to use the code word of the left unit of the reading heads. Conversion is called out after decoding the true code word.

The binary code shown for the code mark sequence has the advantage of particularly reliable readability. However, based on-the representation and disclosure, it also is not difficult to device higher level code marks, in the same way, for example, ternary or quaternary marks, instead of the binary code marks.

In order to be able to address an distance of 655.35 meters when employing a binary code, for a bit length of 1 cm, 11 code words are required on code carrier 11 and these words each have 16 places. The reading head of code reading apparatus 12 then will have a length of at least 16 cm. On the other hand, if a three-value code is used instead of the two-value or binary code for addressing, a distance of 1771.46 m can be addressed with an 11-place code word length. The reading head would have only a length of approximately 11 cm. It would have two-thirds of the length of the reading head for a 16-place binary code, with which only one-third of the extension length can be read or addressed.

Figures 9, 10:
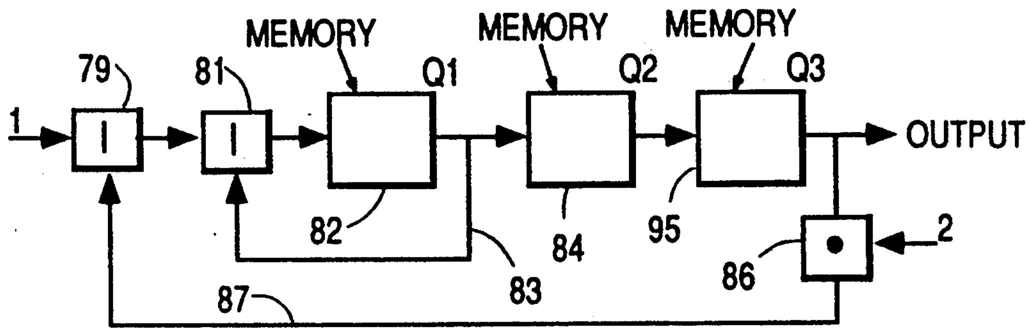
FIG. 9 shows a three-place feedback shift register for producing a pseudo-random numerical sequence with a three-value code, whereby each number occurs only once within the sequence.
FIG. 10 shows the code words or numbers to be produced successively by the shift register according to FIG. 9, with the respective numbers.

As is shown in the following, the above-mentioned system can also be converted to a three-value or ternary code. A shift register for a ternary code is shown in FIG. 9 in simplified representation. The circuit according to FIG. 9 contains a first modulo-3 summing unit 79 with two inputs, one of which continually is fed a "1". The output of modulo-3 summing unit 79 is connected downstream to another modulo-3 summing unit 81, also with two inputs and an output, which is connected to an input of a first memory 82, whose content corresponds to place Q1 of the code word. The output of memory 82 is connected over a feedback line 83 to the second input of modulo-3 summing unit 81, and also to an input of a second memory 84, whose output is connected with the input of a third memory 85. This output of memory 85 represents the output of the circuit for producing a pseudo-random sequence with a three-value code. It is also connected to an input of a modulo-3 multiplier 86, whose other input is continually fed a "2". This modulo-3 multiplier 86 has the property to multiply by 2 the number appearing at the output of memory 85 and from this to make a number falling in the numerical range of the code. This means that, if a "0" arrives at the output of memory 85, modulo-3 multiplier 86 also supplies a "0" at its output, which is fed to the second input of modulo-3 summing unit 79 via a feedback line 87. If the output of memory 85 supplies a "1", modulo-3 multiplier 86 produces a "2" at its output and if, as a last possibility, memory 85 contains a "2", modulo-3 multiplier 86 produces a "1" from this.

It is understood that each of the connection lines shown between modulo-3 summing units 79, 81, are multiple lines to memories 82, 84, 85 as well as modulo-3 multiplier 86, in order to change the numerical values over to the next ones by a switching circuit. The transfer of numbers from one memory to the next occurs upon each clock pulse from a clock generator which is not illustrated.

The digital combinations illustrated in FIG. 10 are successively obtained in the above-mentioned memories 82, 84, 85 during the cycling of the circuit shown in FIG. 9, proceeding from state 000 in memories 82, 84, 85. This table corresponds to the table of FIG. 4.

Figure 11:
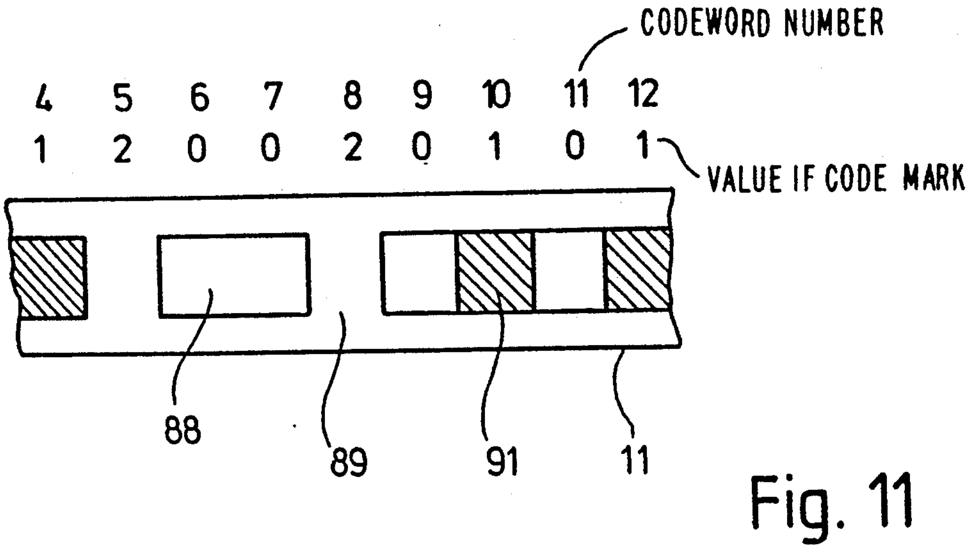
FIG. 11 shows a code mark carrier in which a three-value code is encoded by gray values.

FIG. 11 shows a three-value code on code carrier 11. When a transmissive scanning process is used, code carrier 11, on which a "0" shall be represented, is transparent, as is shown by 88. The "2", thus the maximum value digit from the character set is read at that place at which code carrier 11, as at 89, is nontransparent to light. The value "1" lying between the values "0" and "2" is formed by a grid structure 91, and transmitting a quantity of light, which lies between the full shadowing by a code mark corresponding to a "2" and complete transparency corresponding to a code mark which represents the "0". Otherwise, as before, all of the code marks are of equal length.

The section of code carrier 11 shown in FIG. 11 thus contains the code marks corresponding to the digital sequence 120020101. If this numerical pattern is compared to the table according to FIG. 10, it is not difficult to recognize that if the reading head reads the three left digits, it recognizes a number, which is to be obtained after the fourth clock cycle with the circuit according to FIG. 9 The tables of FIG. 10 are to be read from left to right; the numbers on code carrier 11 from right to left. If the reading head in FIG. 11 is shifted to the right, it will read the digital sequence 200, which corresponds to the fifth code word number of the table, etc.

Figure 12:
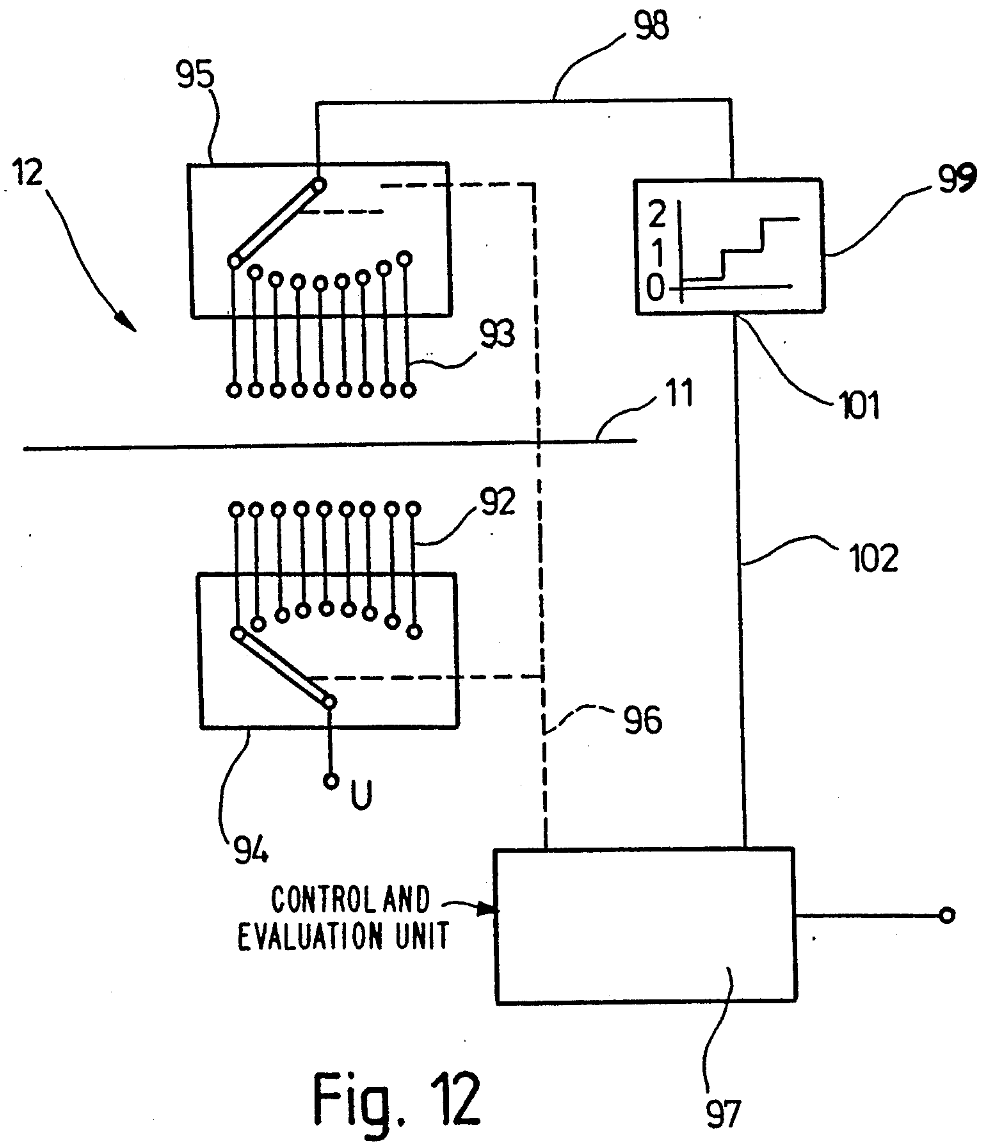
FIG. 12 shows a block diagram for a code reading device for reading the code carrier according to FIG. 11.

A suitable electronic evaluating unit for covering the code marks appearing on code carrier 11 is schematically shown in the block diagram of FIG. 12. The transmissive code carrier 11 extends between a group of light emitting diodes (LEDs) 92 and a group of photodiodes or phototransistors 93. The number of LEDs 92 for illumination and the number of photodiodes 93 is selected according to the example of the embodiment explained on the basis of FIG. 8 and is 3 times the number of places, which one code word comprises. Since in the present case, a three-place code is selected, the number of photodiodes and LEDs is 9. These semiconductor structural components 92, 93 are sequentially addressed and read out via multiplexers 94, 95. Both multiplexers 94 and 95 are represented schematically as mechanical switches, although electronic digital switches, as are common today, can be used. Both multiplexers 94 and 95 are controlled by a control line 96 from a central electronic evaluating and control unit 97.

The input of multiplexer 94 is connected to voltage supply U and this permits illuminating selectively one of the LEDs 92 by connection to the voltage supply. The output of multiplexer 95 is connected via line 98 to the input of an analog-digital converter 99, which has the task of converting the analog signal supplied on line 98 from the respective photodiode 93 to a digital signal, which corresponds to one of the three possible digital values "0", "1", or "2" depending on the intensity of illumination of the respective photodiode 93. Analog-digital converters suitable for this purpose are known and thus no detailed description need be given here. The analog-digital converter supplies the digital number corresponding to the digit read at its output 101 to the central electronic control and evaluating unit 97 by means of a line 102.

Operation of circuit of FIG. 12

The two multiplexers 94 and 95 are actuated synchronously by central control and evaluating unit 97 via control line 96. In this way, a pair comprised of an optically coupled photodiode - LED pair is enabled. The LED is illuminated because of the connection to voltage supply U, while the associated photodiode 93 in back of code carrier 11 is switched to analog-digital converter 99. The digital number thus read is transmitted to the central electronic control and evaluating unit 97. Unit 97 contains a linear memory, which has a memory place for each photodiode 93, which can store the numbers between "0" and "2".

After switching both multiplexers 94 and 95 through all possible positions as soon as all photodiodes 93 have been connected once to analog-digital converter 99, the central electronic control and evaluating unit 97 contains a complete pattern of the code carrier portion which was read. Since photodiodes 93, as mentioned, are distributed in the same way as in the example of embodiment according to FIG. 8, three numerical values interleaved in one another are recorded in the respective memory of the electronic control and evaluating unit, and these values now, as described in connection with FIG. 8, are accordingly evaluated and may be converted to the respective pulse pattern. There is also the possibility to first convert the numbers obtained and interleaved into the code word number or clock cycle number and then to make the comparison as is described in connection with FIG. 8. In this way, for example, a priority condition may be provided, insofar as the actual position of crane 4 is that position which results if two code word numbers are equal; or it is that one which is the lower one of two word numbers, if two decoded numbers differ by "1" in their code word number.

Figure 13:
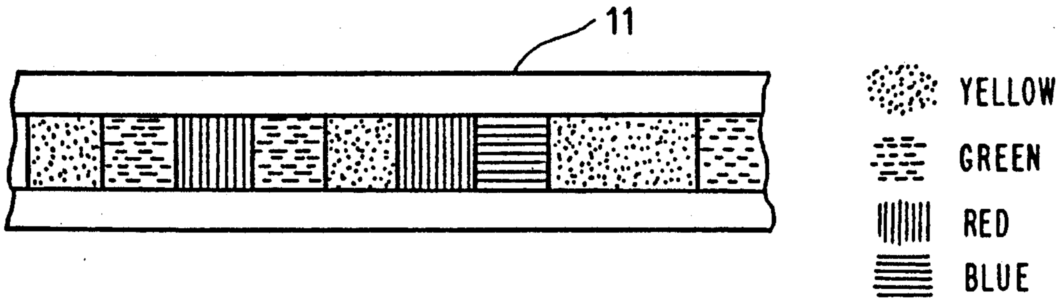
FIG. 13 shows a code carrier with a color coding of the code mark values.

Instead of coding the numerical values between "0" and "2" by the gray values as is shown in FIGS. 11 and 12, the numerical values may also be color coded. A color coding also permits in a simple way a higher-value or higher level code. FIG. 13 is an example of a four-value code on the code carrier, whose digits are coded by the colors yellow, green, red, and blue.

Figure 14:
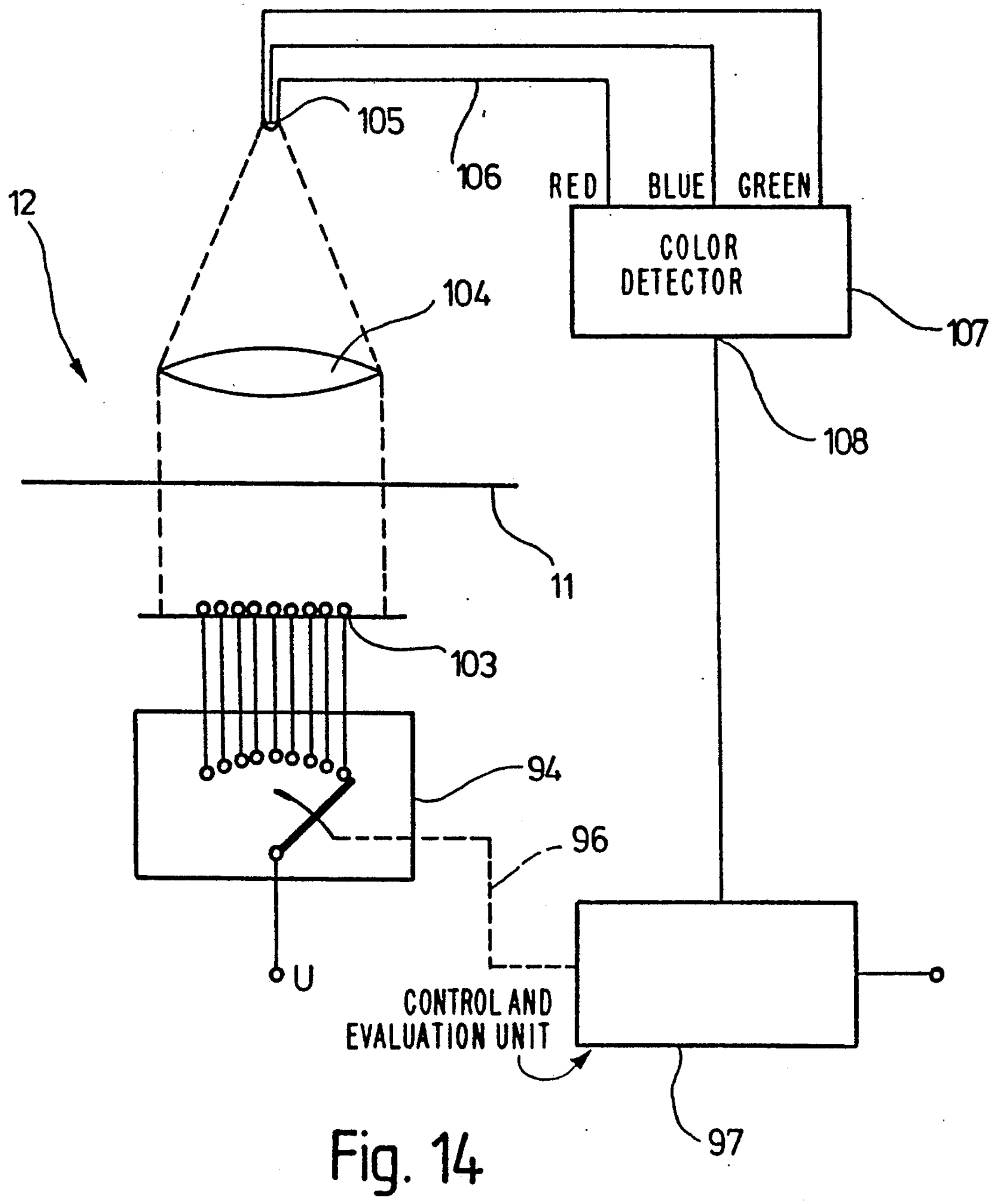
FIG. 14 shows a block diagram for a code reading device with color coding of the values for the code marks.

The circuit arrangement shown in the block diagram in FIG. 14 for reading a color-coded code carrier 11 contains punctiform luminous illumination devices 103, which provide light which is as close to white as possible. The number of these illumination devices is selected according to the information in the example of embodiment according to FIG. 8 and also the distance between the luminous devices selected such that the distance between neighboring luminous devices 103 corresponds to one-third of the code-mark length. Luminous devices 103 are connected to the input side of multiplexer 94, which connects them successively with voltage supply U and in this way introduces illumination. On the other side of code carrier 11, an optical unit 104 is located, which forms an image of all code marks lying within one-code word length on a photodetector 105. Photodetector 105, for example, consists of three photodiodes provided with respective color filters, so that only one photodiode produces a maximum output signal, whose filter color agrees with the respective color of the code mark. It is also possible to use only three spectral colors: red, green and blue as filter colors. The signal yellow is then recognized when the photodiode for green and that for red light supply approximately the same signal amplitudes.

Photodetector 105 is connected with a color detector 107 by means of several lines 106. An individual line 106 is assigned to each color for light passing through a corresponding filter for a photodiode of the photodetector, which is sensitive for one of the spectral colors. In the selected example, there are three lines, since the color yellow is determined on the basis of the signals on the lines for red and for green.

Color detector 107 provides at its output 108 a digital number, which belongs to the color read on code carrier 11 corresponding to the selected table. The electronic control and evaluating unit 97 processes these digital numbers, as is explained in connection with FIG. 12.

Since only one of the punctiform light sources 103 is activated each time, the electronic control and evaluating unit 97 recognizes which "reading head" is active, although only one common photodetector 105 is provided for all reading heads. The common photodetector 105, with each of the respective ones of the light sources 103, forms a reading head corresponding to the reading head 58 described in connection with FIG. 8.

Various changes and modifications may be made within the scope of the inventive concept.

We claim:

1. A position indicating apparatus for transport systems having
   a transport carrier (4);
   a rail or track (2) along which the transport carrier operates;
   a code carrier (11) located longitudinally along the rail or track;
   code marks (17) sequentially located on said code carrier, in a single row, one laterally adjacent the other, and placed in accordance with a predetermined code mark sequence, wherein m sequential code marks (17) form a code word; and
   code reading means (12, 18, 19) including reading stations (19) on said transport carrier (4) positioned for reading said code marks forming the code words,
   wherein said code reading means (19) comprises three sets of reading heads (58*a*, 58*b*, 58*c*), wherein the number of reading heads (58*al*. . . 58*an*; 58*bl*. . . 58*bn*; 58*cl*. . . 58*cn*) of any one set (58*a*. . .58*c*) is at least as great as the number of digits of a code word;
   the reading heads (58*al*, 58*bl*, 58*cl*. . . 58*cn*) are spaced equidistantly, uniformly, longitudinally with respect to the code carrier (11);
   the reading heads (58*al*, 58*bl*. . .58*cn*) of any one set (58*a*, 58*b*, 58*c*) are spaced from each other by a distance which is equal to the length of a code mark (17);
   the reading heads (58*al*. . . 58*cn*) of the three sets of reading heads are so placed on the code reading stations(19) that there is at least one position of the code reading stations (19) relative to the code carrier (11) in which three reading heads (e.g. 58*al*, 58*bl*, 58*cl*) which are located immediately adjacent each other and belong to all three sets scan a single discrete code mark (17); and a selection circuit (61) is provided, coupled to the reading heads (58*al*. . .58*cn*) of the sets (58*a*, 58*b*, 58*c*) for decoding the true code word in dependence on the signals delivered from said reading heads and providing an output code word representative of said decoded true code word.

2. The apparatus of claim 1, wherein said selection circuit (61) comprises at least one digital comparator (63), said comparator (63) having two sets of inputs (66, 67) and a control output (76);

one set of inputs (66) being coupled to all the reading heads (58*bl*. . . 58*bn*) associated with that one of the sets of reading heads intermediate adjacent other sets (58*a*, 58*c*) and the three sets being coupled to the other set (67) of inputs of said digital comparator (63);

a multiplexing circuit (68), having two sets of inputs (69, 71), one of said sets of inputs (71) being coupled to all the reading heads (58*b*. . .58*n*) of said intermediate set of reading heads (58*b*), said multiplexing circuit having a further set (69) of inputs, and a set of outputs (72);

said further set of inputs (69) being coupled to the reading heads (58*al*. . .58*an*; 58*cl*. . .58*cn*) of one of the sets of reading heads (58*a*, 58*c*) which is not coupled to the digital comparator (63);

and wherein the multiplexing circuit (68) is connected to decode the signals such that, upon equality of the signals applied to the digital comparator (63), the signals from the median or central set (58*b*) of reading heads (58*bl*. . . 58*bn*) is coupled to the output (72) of said multiplexing circuit and, upon inequality of signals applied to the digital comparator (63), the signals from the reading heads (58*al*. . . 58*an*; 58*cl*. . . 58*cn*) of the sets of reading heads are coupled to the output (72) of the multiplexing circuit;

and wherein the sets of inputs (66, 67) to said at least one comparator (63) and the inputs (69, 71) to said multiplexing circuit (68) and the outputs (72) from said multiplexing circuit define a terminal corresponding to each digit of the code word.

3. The apparatus of claim 1, wherein the sequence of code marks has the cycling or period length of $$N = x^m - 1$$

wherein

N is the number of code marks (17), x is the value of one code mark (17), and m is a positive whole number which indicates how many code marks (17) form a code word.

4. The apparatus of claim 1, wherein an m - place shift register is provided, including a linear feedback circuit;

sequential code marks (17) are positioned in accordance with a pseudo-random sequence or code on said code carrier, and wherein the value of the individual sequential code marks is determined by an output signal derived from said shift register, in accordance with a generated polynomial pseudo-random sequence at the outputs ($Q_1$, $Q_2$, $Q_3$, $Q_4$, $Q_5$) of the shift register, said outputs being logically interconnected;

and wherein the result of the output from the shift register is fed back and coupled to the input ($D_1$) of said shift register (23*a*. . . 23*e*).

5. The apparatus of claim 1, wherein the code marks (17) are binary marks representative of binary values.

6. The apparatus of claim 1, further including a conversion circuit (28*a*. . . 28*c*) converting a code word read from said code carrier (11) into a binary number, and wherein the value of the binary number corresponds to the number of the code word within the code mark sequence which is applied on the code carrier (11).

7. The apparatus of claim 6, wherein said conversion circuit (28*a*. . . 28*c*) comprises a linear m - place shift register including a feedback circuit from the output to the input thereof;

a start-stop counter (36) and a binary counter (44) counting clock signals in dependence on starting and stopping of said start-stop counter (36);

a digital comparator (29) connected for comparing a code word read by said code reading means (19) with a supplied code word provided by said shift register (34);

and a control circuit (39) responsive to (a) inequality between the read code word which was read by said code reading means (19) and the supplied code word from the shift register (34), causes reset of the shift register (34) and said binary counter (44) to ZERO or START position, and causes starting of the START/STOP counter (36) for counting in accordance with clock pulses in the counter (44) and shifting in the shift register (34) for generating and supplying, sequentially, supplied code words until (b) the supplied code word derived from the shift register (34) has equality with the read code word derived from the reading means (19);

said control circuit causing the START/STOP counter to stop counting upon detection of such equality.

8. The apparatus of claim 6, wherein said conversion circuit (28*a*. . . 28*c*) includes a random access memory (ROM) (55) storing the number of the code word under the address thereof in form of a binary number, and storing the number of the code word of the code words read by said reading means (19).

9. The apparatus of claim 1, wherein the code marks have values higher than binary values.

10. The apparatus of claim 9, wherein the numerical values of the code are represented as gray values on said code carrier (11).

11. The apparatus of claim 9, wherein the numerical values of the code represented on the code carriers are recorded on the code carrier in form of colors.

12. The apparatus of claim 1, wherein each reading head (19) includes a light source (92) and a light sensor (93) associated with the light source to form a reading head pair;

and control means (92) are provided, for temporally controlling said pair to render active only one pair, at a time, within said reading head.

13. The apparatus of claim 1, wherein each reading head comprises its own light source (103), and a common light sensor (105) responsive to all light sources (103).

14. The apparatus of claim 1, wherein all reading heads (58*al*. . . 58*an*) of at least one set (58*a*) are activated simultaneously.

15. The apparatus of claim 1, wherein the code marks (17) are applied to the code carrier sequentially next to each other devoid of interstices or gaps between adjacent code marks.

16. The apparatus of claim 2, wherein the code marks (17) are applied to the code carrier sequentially next to each other devoid of interstices or gaps between adjacent code marks.

17. The apparatus of claim 3, wherein the code marks (17) are applied to the code carrier sequentially next to each other devoid of interstices or gaps between adjacent code marks.

18. The apparatus of claim 4, wherein the code marks (17) are applied to the code carrier sequentially next to each other devoid of interstices or gaps between adjacent code marks.

19. The apparatus of claim 5, wherein the code marks (17) are applied to the code carrier sequentially next to each other devoid of interstices or gaps between adjacent code marks.

* * * * *